(12) United States Patent
Lin et al.

(10) Patent No.: US 8,850,391 B1
(45) Date of Patent: Sep. 30, 2014

(54) SYSTEM AND METHOD FOR BUILDING COMPONENTS OF A SOFTWARE PRODUCT IN A DISTRIBUTED SYSTEM

(75) Inventors: Shuang Lin, New York, NY (US); Micah Lemonik, Great Neck, NY (US); Chaitanya Bhuskute, New York, NY (US); Mithravindhaa Seshadrirajah, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 13/359,941

(22) Filed: Jan. 27, 2012

(51) Int. Cl.
*G06F 9/44* (2006.01)

(52) U.S. Cl.
USPC ............ 717/121; 717/124; 717/126; 717/127

(58) Field of Classification Search
CPC ........... G06F 8/71; G06F 8/70; G06F 9/4453; G06F 8/20; G06F 11/3904
See application file for complete search history.

(56) References Cited

U.S. PATENT DOCUMENTS

| | | | |
|---|---|---|---|
| 7,519,953 B2 * | 4/2009 | Reissman et al. | 717/124 |
| 7,665,068 B2 * | 2/2010 | Neumann et al. | 717/125 |
| 7,950,004 B2 * | 5/2011 | Vieira et al. | 717/125 |
| 7,984,426 B2 * | 7/2011 | Loff | 717/121 |
| 2005/0066307 A1 * | 3/2005 | Patel et al. | 717/124 |
| 2005/0071818 A1 * | 3/2005 | Reissman et al. | 717/127 |
| 2005/0132333 A1 * | 6/2005 | Neumann et al. | 717/124 |
| 2007/0220342 A1 * | 9/2007 | Vieira et al. | 714/33 |
| 2008/0052690 A1 * | 2/2008 | Bharadwaj | 717/140 |
| 2009/0187894 A1 * | 7/2009 | Bell et al. | 717/127 |
| 2010/0042974 A1 * | 2/2010 | Gutz et al. | 717/121 |
| 2010/0257517 A1 * | 10/2010 | Sriram et al. | 717/168 |
| 2011/0239195 A1 * | 9/2011 | Lin et al. | 717/126 |
| 2012/0246616 A1 * | 9/2012 | Frontiero et al. | 717/121 |

OTHER PUBLICATIONS

Clemens Szyperski; Component technology—what, where, and how; 2003 IEEE; pp. 684-693; <http://dl.acm.org/citation.cfm?id=776916>.*
Sherif M. Yacoub et al.; Scenario-Based Reliability Analysis of Component-Based Software; 1999 IEEE; 10 pages; <http://ieeexplore.ieee.org/stamp/stamp.jsp?tp=&arnumber=809307>.*
Rob van Ommering; Building Product Populations with Software Components; 2002 ACM; pp. 255-265; <http://dl.acm.org/citation.cfm?id=581373>.*
Geoff Coulson et al.; A Generic Component Model for Building Systems Software; 2008 ACM; 42 pages; <http://dl.acm.org/citation.cfm?id=1328672>.*
Hui Ding et a.; The Dependency Management Framework a Case Study of the ION CubeSat; 2006 IEEE; 10 pages; <http://ieeexplore.ieee.org/stamp/stamp.jsp?tp=&arnumber=1647725>.*
Jiang Guo; A Coordination Framework for Software Component Based Development; 2006 IEEE; 8 pages; <http://ieeexplore.ieee.org/stamp/stamp.jsp?tp=&arnumber=4020089>.*

* cited by examiner

*Primary Examiner* — Thuy Dao
*Assistant Examiner* — Cuong V Luu
(74) *Attorney, Agent, or Firm* — Ropes & Gray LLP

(57) ABSTRACT

A computer-implemented method of compiling source code of a software product including a plurality of components is disclosed. The method includes receiving at least one changelist identifying at least one component of the plurality of components, testing the at least one component using a defined set of tests for each of the plurality of components, approving the at least one changelist when testing of the at least one component identified in the changelist results in compliancy, calculating dependencies between the plurality of components using the compliant at least one changelist, and building the software product by concurrently building the plurality of components based on the calculated dependencies.

24 Claims, 4 Drawing Sheets

SYSTEM AND METHOD FOR BUILDING COMPONENTS OF A SOFTWARE PRODUCT IN A DISTRIBUTED SYSTEM

BACKGROUND

1. Field of the Disclosure

The present disclosure relates to building a software product of multiple components in a unified manner.

2. Background Information

A software product may include many components which interact with each other. For example, a product may include components such as a document editor, a spreadsheet editor, and a document list manager, each of which interact with one another. Each component may also include sub-components which interact with other components or sub-components.

The components may be developed by different teams, and may be built and released separately at different schedules. However, significant collaboration efforts may be required to release new versions of the components in order to prevent compatibility issues arising between the components.

SUMMARY OF THE DISCLOSURE

The present disclosure discusses systems and methods for providing a unified software build allowing multiple components of a software product to be built and released at the same time. The unified build can also enable testing of multiple components in a controlled environment before a public release of a software product.

In one aspect, a computer-implemented method of compiling source code of a software product including a plurality of components includes receiving at least one changelist identifying at least one component of the plurality of components, testing the at least one component using a defined set of tests for each of the plurality of components, approving the at least one changelist when testing of the at least one component identified in the changelist results in compliancy, calculating dependencies between the plurality of components using the compliant at least one changelist, and building the software product by concurrently building the plurality of components based on the calculated dependencies.

The received at least one changelist may be submitted by a user terminal (which user terminal may be, for example, any client, client device or client system). Building the software product may include building a first group of components concurrently which do not have a build dependency, and building a second group of components concurrently which depend on the built first group of components. Same components in the first group of components and the second group of components may be built once.

The plurality of components may include at least one of a document editor, a spreadsheet editor, a presentation editor, a drawing editor, a document list manager, a document format conversion application, and an online clipboard application. The method may also include deploying the built software product to a testing environment. The at least one changelist may be received by a management system, which automatically triggers the testing of the at least one component.

The tested at least one component may be compliant when the test returns a pass, and may be non-compliant when the test returns a fail and otherwise non-deterministic. The method may also include performing a query to determine the approved changelists at a predetermined interval, and calculating the build dependencies in response to the query. The built software product may be packaged and deployed into a production environment.

In another aspect, a system for compiling source code of a software product including a plurality of components includes a testing system which tests at least one component of the plurality of components which is identified by at least one changelist, and a build system which compiles the source code of the software product. The testing system tests the at least one component using a defined set of tests for each of the plurality of components, and approves the at least one changelist when the testing of the at least one component identified by the changelist results in compliancy, and the build system calculates dependencies between the plurality of components using the compliant at least one changelist, and builds the software project by concurrently building the plurality of components based on the calculated dependencies.

The at least one changelist may be submitted by a user terminal. The build system may build the software product by building a first group of components concurrently which do not have a build dependency, and building a second group of components concurrently which depend on the built first group of components. Same components in the first group of components and the second group of components may be built once.

The plurality of components may include at least one of a document editor, a spreadsheet editor, a presentation editor, a drawing editor, a document list manager, a document format conversion application, and an online clipboard application. The build system may deploy the built software product to a testing environment. The at least one changelist may be received by a management system, which automatically triggers the testing of the at least one component.

The tested at least one component may be compliant when the test returns a pass, and may be non-compliant when the test returns a fail and otherwise non-deterministic. The system may also include a control system which performs a query to determine the approved changelists at a predetermined interval, and the build system may calculate the build dependencies in response to the query. The built software product may be packaged and deployed into a production environment.

In another aspect, a non-transitory computer-readable medium may store instructions that, when executed, perform operations including receiving at least one changelist identifying at least one component of the plurality of components, testing the at least one component using a defined set of tests for each of the plurality of components, approving the at least one changelist when testing of the at least one component identified in the changelist results in compliancy, calculating dependencies between the plurality of components using the compliant at least one changelist, and building the software product by concurrently building the plurality of components based on the calculated dependencies.

The received at least one changelist may be submitted by a user terminal. Building the software product may include building a first group of components concurrently which do not have a build dependency, and building a second group of components concurrently which depend on the built first group of components. Same components in the first group of components and the second group of components may be built once.

The plurality of components may include at least one of a document editor, a spreadsheet editor, a presentation editor, a drawing editor, a document list manager, a document format conversion application, and an online clipboard application. The operations may also include deploying the built software product to a testing environment. The at least one changelist may be received by a management system, which automatically triggers the testing of the at least one component.

The tested at least one component may be compliant when the test returns a pass, and may be non-compliant when the test returns a fail and otherwise non-deterministic. The operations may also include performing a query to determine the approved changelists at a predetermined interval, and calculating the build dependencies in response to the query. The built software product may be packaged and deployed into a production environment.

The details of one or more embodiments are set forth in the accompanying drawings and the description below. Other features and advantages will be apparent from the description and drawings, and from the claims.

BRIEF DESCRIPTION OF DRAWINGS

The present disclosure is further described in the detailed description which follows, in reference to the noted plurality of drawings, by way of non-limiting examples of preferred embodiments of the present invention, in which like characters represent like elements throughout the several views of the drawings.

DETAILED DESCRIPTION

The present disclosure, through one or more of its various aspects, embodiments and/or specific features or sub-components, is thus intended to bring out one or more of the advantages as specifically noted below.

The systems and methods described below may be utilized in the production of a software product including a plurality of components which interact with one another. Examples of such components include, but are not limited to, a document editor, a spreadsheet editor, a presentation editor, a drawing editor, a document list manager, a document format conversion application, and an online clipboard application.

The source code, configuration files, documentation, etc. of the software product is often created by one or more developers. To add a component to the software product, or to modify an existing component (such as to add or modify a feature, or to add or modify a dependency between components), developers create changelists. Each changelist identifies at least one software component which the developers desire to incorporate into the software product. Changelists identify the changes in components that have been deployed from different sites and different developers working simultaneously on updates within the same software product(s).

Figure 1:
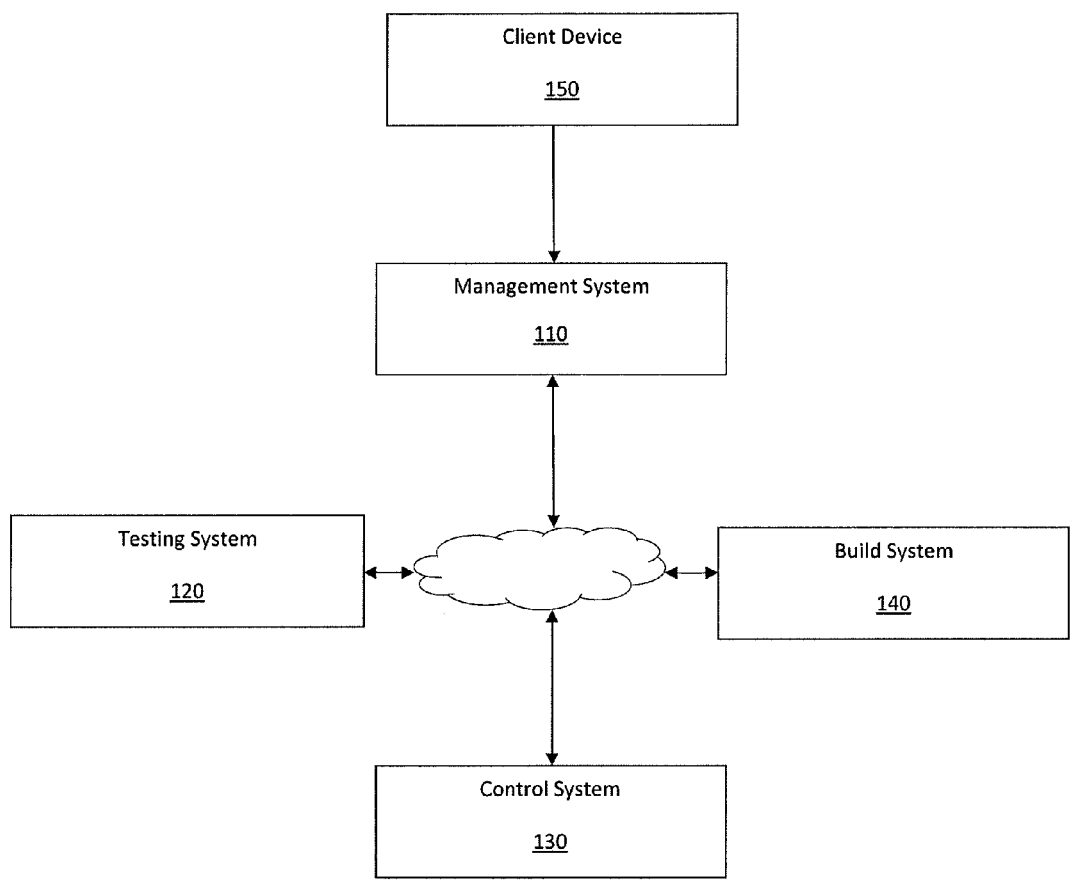
FIG. 1 is an exemplary diagram of a system for producing a software product.

FIG. 1 is an exemplary diagram of a system for producing a software product. The system 100 includes a management system 110, a testing system 120, a control system 130 and a build system 140. The management system 110, the testing system 120, the control system 130 and the build system 140 are each computer systems which may operate as a standalone device, or may include any collection of networked computers that individually or jointly execute a set, or multiple sets, of instructions to perform one or more functions. Further, the management system 110, the testing system 120, the control system 130 and the build system 140 may share common hardware.

The management system 110 is a computer system which performs centralized revision control of new or revised components. The management system 110 may be, for example, a source code management (SCM) system, a software configuration management system, which manages changes to documents, programs and other information, a version control system (VCS), which is a stand-alone application with revision control embedded in various types of software such as word processors, spreadsheets, etc., or a distributed revision control system (DRCS), in which a peer-to-peer approach allows a central repository on which clients may synchronize revisions. The management system 110 is not limited to the described embodiments, but may employ any system known in the art. Developers working on software components at user terminals, such as local client workspaces 150, may submit new or revised components to the management system 110, along with a corresponding changelist. When a changelist is submitted to the management system 110, an automated monitoring mechanism triggers testing of the component by the testing system 120. The automated monitoring mechanism may be, for example, a custom script or program that runs on the management system 110 upon receiving the changelist. Although an automatic monitoring mechanism is used in the exemplary embodiment, the disclosure is not limited to automatic detection. For example, the management system 110 may be set to receive and submit changelist(s) at various intervals, or wait to be prompted by a command before execution of the aforementioned processes.

The testing system 120 is, for example, a computer system dedicated to running tests. The testing system 120 runs tests on each of the components identified by the changelist. A set of tests is defined for each of the components of the software product. The changelist may also define a test or set of tests to be run on the components. At the conclusion of each test, the test system 120 generates the result as one of passing, failing, or non-deterministic (such as when there is a time-out or tool failure). A component is determined to be compatible with a product when it passes the tests of the defined set of tests for the component. When each component in the changelist has passed the set of tests, the testing system 120 approves the changelist. That is, when testing results in a "pass", the component is compliant with a software product specification. When a test results in "failed" or "non-deterministic", the component is non-compliant and further revision is required to the component (or other components). It is appreciated that the testing system is not limited to the described embodiment and need not be a dedicated system.

The control system 130 is, for example, a computer system which controls a release workflow of the software product. At a predetermined interval (such as once a day), the control system 130 may query the testing system 120 to gather approved changelist(s). This may be accomplished, for example, by the testing system 120 running an application programming interface (API) which performs a query function that returns the approved changelist(s). As described further below, the approved changelists may provide a baseline for building the components of the software concurrently. It is also appreciated that the control system 130 is not limited to queries at predetermined intervals, but may perform any number of queries at any time.

The build system 140 is, for example, a computer system which compiles source code of the software product. After the control system 130 queries the testing system 120, the control system 130 instructs the build system 140 to build the software product using the components of the approved changelist(s). At this time, the build system 140 calculates a dependency tree representing dependencies of the components towards each other (described below in more detail). That is, for each of the components, the build system 140 generates a dependency tree that determines whether a component relies upon any other component in order for it to be built. Thus, a build dependency is calculated for each of the components. It is appreciated that while a dependency tree is calculated in the exemplary embodiment, the disclosure is not limited to such an embodiment. Any form of table, chart, algorithm or otherwise may be used to map dependencies, as readily appreciated by the skilled artisan.

Figure 2:
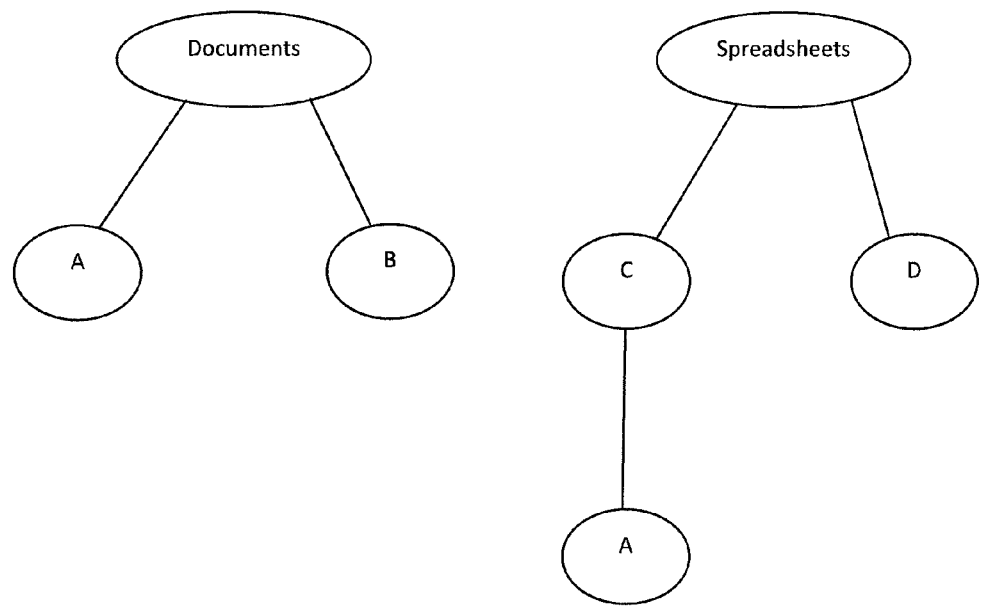
FIGS. 2A and 2B illustrate an exemplary diagram of a changelist table and dependency tree of components in the software product.

FIGS. 2A and 2B illustrate an exemplary diagram of a changelist table and dependency tree of components in the software product. FIG. 2A shows an exemplary changelist table for components in a software product. For example, the table shows a first component ("Documents Editor") and a second component ("Spreadsheets Editor"). Each of the components includes a series of changelists that have been submitted as a result of the component being changed or revised. For example, the Document Editor and Spreadsheet Editor components have been changed or revised five times (i.e. five versions have been submitted for each component). With each changelist, as explained above, the testing system 120 determines whether the component has failed or passed the test (or is non-deterministic). In the example illustrated, the letter "G" represents a pass and "R" represents a fail. From the changelist table, the dependency tree (FIG. 2B) can be computed.

FIG. 2B illustrates an exemplary dependency tree formed in accordance with the table of FIG. 2A. According to the changelist table, the build system 140 generates the dependency tree including the "Documents Editor" component, which depends on software components A and B. A dependency tree for the "Spreadsheets Editor" component is also generated, which depends on components A, C and D, where component C depends on component A. In this example, the build system 140 will concurrently build components A, B and D, which do not have a build dependency (for example, components A, B and D do not rely on another component to be built), followed by concurrently building the "Documents Editor" component and component C (which is dependent on built component A). The "Spreadsheets Editor" component is then built since each of components C and D have been built. Thus, the build system 140 concurrently (i.e. in parallel) builds all components for which any dependency has already been calculated or for which dependency does not exist. Further, the build system 140 ensures that shared components are built once, such that there is no duplication of building the same component. For example, the "Documents Editor" component and "Spreadsheets Editor" component each include component A. However, it is not necessary to build component A twice because it appears in both of the components. As noted, this avoids redundancy in building the software product as well as conserve valuable system resources.

After the build system 140 builds the software product with the components, the control system 130 packages the concurrently built components and deploys them for additional testing. At a predetermined interval (such as once a week), a release branch can automatically be cut, and the software product can be pushed to a wider audience, such as quality assurance testers and internal users. At this time, integration testing and manual exploratory testing can be performed in addition to the testing already performed, and the software product can be patched, for example, to fix bugs or change configurations. Changelists later than the branch-cut can be down integrated by request, and release candidates can be built off the release branch, as readily understood by the skilled artisan. Sometime later (such as a week later), after the software product has been patched as necessary, it can be released to the general public. It is also appreciated that the control system 130 is not limited to queries at predetermined intervals, but may perform any number of queries at any time and is compliant with the software product specification.

Figure 3:
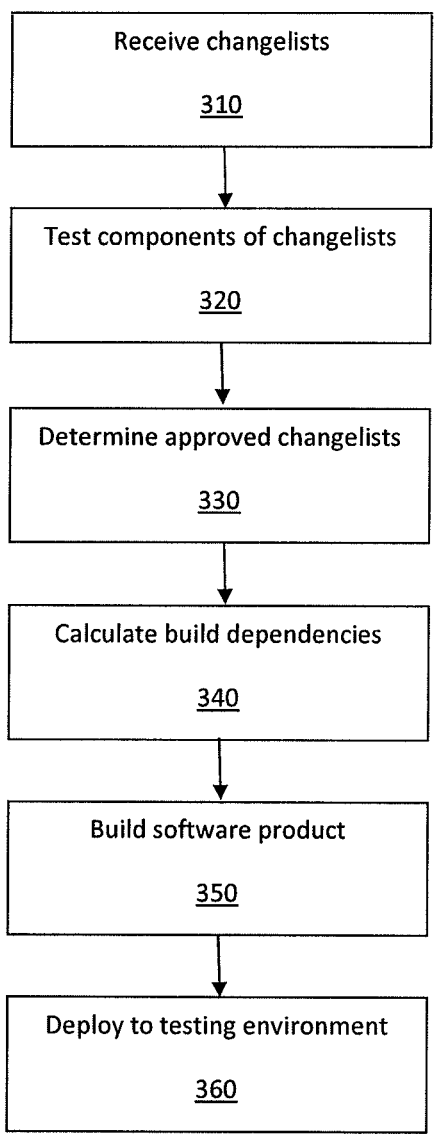
FIG. 3 is an exemplary flow chart of a process for building components of a software product.

FIG. 3 is an exemplary flow chart of a process for building components of a software product. The building process 300 begins at 310, where at least one changelist is submitted. The changelist identifies at least one component of the software product that creates or adds features, and is received by the management system 110 from one or more developers (it is understood that although the term "developer" is used in the exemplary embodiments throughout the disclosure, the disclosure is not limited to such individuals. A changelist can be created by any individual or system as well known in the art). When the management system 110 receives a changelist(s), an automated monitoring mechanism of the management system 110 recognizes the submitted changelist(s), and the process continues to testing at 320. Although an automatic monitoring mechanism is used in the exemplary embodiment, the disclosure is not limited to automatic detection. For example, the management system 110 may be set to receive and submit changelist(s) at various intervals, or wait to be prompted by a command before execution of the aforementioned processes. At 320, each of the components in the received changelist(s) are run through a test or set of tests by the testing system 120. The test(s) are typically defined for each component of the software product, although it is appreciated that the same test(s) could be used for multiple components. The components may also be run through tests defined by the changelist. As described above, when each component of a changelist passes every test, the testing system 120 approves the changelist for build. For example, as shown in FIG. 2A, when each component has passed, a "G" in the changelist table signifies that the component has successfully passed all tests.

Once the changelist(s) have been tested, a query is performed by the control system 130 to determine the approved changelist(s). This may be accomplished, for example, by the testing system 120 running an application programming interface (API) which performs a query function that returns the approved changelist(s) to the control system 130, or by any well known method for approving changelist(s). After determining the approved changelist(s), the process continues at 340. At 340, build dependencies of software product are calculated using the approved changelist(s) determined at 330. This may be accomplished, for example, by the build system 140 calculating a dependency tree representing dependencies of the components towards one another. It is appreciated that while a dependency tree is calculated in the exemplary embodiment, the disclosure is not limited to such an embodiment. Any form of table, chart, algorithm or otherwise may be used to map dependencies, as readily appreciated by the skilled artisan.

After the build dependencies have been calculated at 340, the software product is built using the approved changelist(s) and based on the calculated build dependencies. This may be accomplished, for example, by the build system 140 concurrently building a first group of components of the software product which do not have a build dependency, then building other components and sub-components which depend on the first group of components. In so doing, the build system 140 concurrently builds as many components and sub-components in a concurrent (parallel) manner based on the calculated dependencies (as explained in more detail with reference to FIGS. 2A and 2B). After, the software product is built, it may be deployed to a testing environment at 360.

At 360, the built software product may be deployed to a testing environment, where the software product may be used by developers, etc., and further testing may be performed and fixes can be made. A release branch can be cut appropriately, and the software product can be pushed to a wider audience for testing, where integration testing and manual exploratory testing can be performed.

Figure 4:
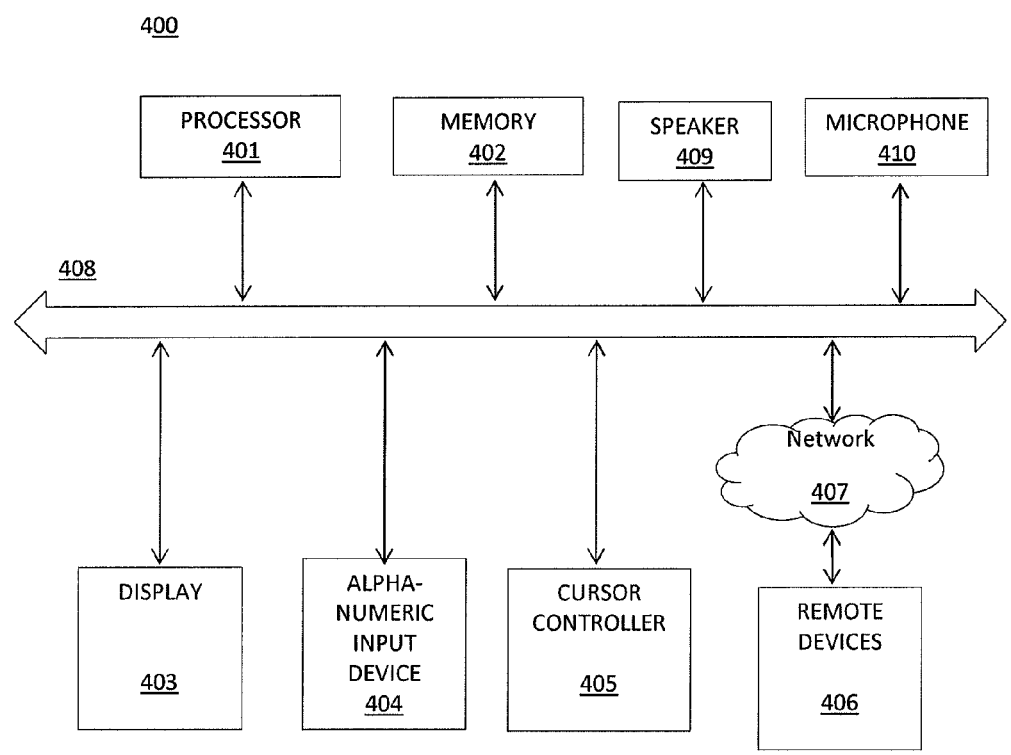
FIG. 4 illustrates an exemplary configuration of a general purpose computer, which may be used to implement the processes disclosed herein.

FIG. 4 illustrates an exemplary configuration of a general purpose computer, which may be used to implement the processes disclosed herein. Each of the management system 110, the testing system 120, the control system 130 and the build system 140 may be implemented with a general purpose computer 400, or with a network of general purpose computers 400. The computer 400 includes one or more sets of computer programming instructions that are stored in memory 402 and that can be executed by processor 401 in computer 400 to perform the process described above. The computer 400 may be present in one of many physical configurations, including being configured as a server.

As illustrated in FIG. 4, the computer 400 includes a processor 401 and memory 402, which is representative of one or more various memories that may be used by the computer 400. These memories may include one or more random access memories, read only memories, and programmable read only memories, etc. Computer 400 also includes at least one display 403, which may be provided in any form, including a cathode ray tube, a LED display, an LCD display, and a plasma display, etc. The display may include provisions for data entry, such as by including a touch-sensitive screen or by providing eye-movement detection technology. Additional output devices may include an audio output device, such as a speaker 409.

Computer 400 further includes one or more input devices. Input devices may include an alpha-numeric input device 404, such as a keyboard; a cursor controller 405, such as a mouse, touch-pad, or joy-stick; and a microphone 410. Computer 400 also enables processor 401 to communicate with one or more remote devices 406 over a network 407 external to computer 400. Communications internal to computer 400 primarily uses bus 408.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Those skilled in the art, of course, appreciate that the various features and embodiments of the above-described systems may be implemented as a program or code segment which are executable for causing a server, computer, or system to operate in accordance with the above-described systems.

Although the disclosed subject matter has been described with reference to several exemplary embodiments, it is understood that the words that have been used are words of description and illustration, rather than words of limitation. Changes may be made within the purview of the appended claims, as presently stated and as amended, without departing from the scope and spirit of the disclosed subject matter. Although the subject matter has been described with reference to particular means, materials and embodiments, the subject matter is not intended to be limited to the particulars disclosed; rather the disclosure extends to all functionally equivalent structures, methods, and uses such as are within the scope of the appended claims.

While a computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any computer-readable medium or other equivalents and successor media, in which data or instructions may be stored.

Although the present disclosure describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present disclosure may encompass software, firmware, and hardware implementations, or combinations thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method of compiling source code of a software product including a plurality of components, comprising:
   receiving at least one changelist identifying at least one component of the plurality of components;
   testing the at least one component using a defined set of tests for each of the plurality of components;
   approving the at least one changelist when testing of the at least one component identified in the changelist results in compliancy;
   calculating dependencies between the plurality of components using the approved at least one changelist by:
      identifying a first group of components which do not have a build dependency; and
      identifying a second group of components which depend on the first group of components, wherein the first group of components and the second group of components form a plurality of dependency trees;
   identifying a shared component that is included in at least two of the plurality of dependency trees; and
   building the software product by concurrently building at least some of the plurality of components based on the calculated dependencies, wherein the shared component is built only once, and building the software product comprises building the first group of components concurrently and building the second group of components concurrently.

2. The method according to claim 1, wherein the received at least one changelist is submitted by a user terminal.

3. The method according to claim 1, wherein the plurality of components comprise at least one a document editor, a spreadsheet editor, a presentation editor, a drawing editor, a document list manager, a document format conversion application, and an online clipboard application.

4. The method according to claim 1, further comprising deploying the built software product to a testing environment.

5. The method according to claim 1, wherein the at least one changelist is received by a management system, which automatically triggers the testing of the at least one component.

6. The method according to claim 1, wherein the tested at least one component is compliant when the test returns a pass, and is non-compliant when the test returns a fail and otherwise non-deterministic.

7. The method according to claim 1, further comprising:
   performing a query to determine the approved changelists at a predetermined interval, and
   calculating the build dependencies in response to the query.

8. The method according to claim 1, wherein the built software product is packaged and deployed into a production environment.

9. A system having a processor for compiling source code of a software product including a plurality of components, comprising:
   a testing system which tests at least one component of the plurality of components which is identified by at least one changelist; and
   a build system which compiles the source code of the software product,
   wherein the testing system tests the at least one component using a defined set of tests for each of the plurality of components, and approves the at least one changelist when the testing of the at least one component identified by the changelist results in compliancy, and
   the build system calculates dependencies between the plurality of components using the approved at least one changelist by:
      identifying a first group of components which do not have a build dependency; and
      identifying a second group of components which depend on the first group of components, wherein the first group of components and the second group of components form a plurality of dependency trees;
   identifying a shared component that is included in at least two of the plurality of dependency trees; and
   the build system further builds the software project by concurrently building at least some of the plurality of components based on the calculated dependencies, wherein the shared component is built only once, and the build systems builds the software product by building the first group of components concurrently and building the second group of components concurrently.

10. The system according to claim 9, wherein the at least one changelist is submitted by a user terminal.

11. The system according to claim 9, wherein the plurality of components comprise at least one of a document editor, a spreadsheet editor, a presentation editor, a drawing editor, a document list manager, a document format conversion application, and an online clipboard application.

12. The system according to claim 9, wherein the build system deploys the built software product to a testing environment.

13. The system according to claim 9, wherein the at least one changelist is received by a management system, which automatically triggers the testing of the at least one component.

14. The system according to claim 9, wherein the tested at least one component is compliant when the test returns a pass, and is non-compliant when the test returns a fail and otherwise non-deterministic.

15. The system according to claim 9, further comprising a control system which performs a query to determine the approved changelists at a predetermined interval,
   wherein the build system calculates the build dependencies in response to the query.

16. The system according to claim 9, wherein the built software product is packaged and deployed into a production environment.

17. A non-transitory computer-readable medium which stores instructions that, when executed, perform operations comprising:
  receiving at least one changelist identifying at least one component of the plurality of components;
  testing the at least one component using a defined set of tests for each of the plurality of components;
  approving the at least one changelist when testing of the at least one component identified in the changelist results in compliancy;
  calculating dependencies between the plurality of components using the approved at least one changelist by:
    identifying a first group of components which do not have a build dependency; and
    identifying a second group of components which depend on the first group of components, wherein the first group of components and the second group of components form a plurality of dependency trees;
  identifying a shared component that is included in at least two of the plurality of dependency trees; and
  building the software product by concurrently building at least some of the plurality of components based on the calculated dependencies, wherein the shared component is built only once, and building the software product comprises building the first group of components concurrently and building the second group of components concurrently.

18. The computer-readable medium according to claim 17, wherein the received at least one changelist is submitted by a user terminal.

19. The computer-readable medium according to claim 17, wherein the plurality of components comprise at least one of a document editor, a spreadsheet editor, a presentation editor, a drawing editor, a document list manager, a document format conversion application, and an online clipboard application.

20. The computer-readable medium according to claim 17, wherein the operations further comprise deploying the built software product to a testing environment.

21. The computer-readable medium according to claim 17, wherein the at least one changelist is received by a management system, which automatically triggers the testing of the at least one component.

22. The computer-readable medium according to claim 17, wherein the tested at least one component is compliant when the test returns a pass, and is non-compliant when the test returns a fail and otherwise non-deterministic.

23. The computer-readable medium according to claim 17, wherein the operations further comprise:
  performing a query to determine the approved changelists at a predetermined interval, and
  calculating the build dependencies in response to the query.

24. The computer-readable medium according to claim 17, wherein the built software product is packaged and deployed into a production environment.

* * * * *